United States Patent [19]
Yamamoto et al.

[11] Patent Number: 5,815,333
[45] Date of Patent: *Sep. 29, 1998

[54] MAGNETIC DISC WITH A FLAT RAM AREA AND DISC DEVICE

[75] Inventors: Noriyuki Yamamoto, Tokyo; Hiroaki Yada, Kanagawa, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 579,551

[22] Filed: Dec. 27, 1995

[30] Foreign Application Priority Data

Dec. 28, 1994 [JP] Japan .................................. 6-339562

[51] Int. Cl.$^6$ .................................................. G11B 19/04
[52] U.S. Cl. ........................... 360/60; 369/275.3; 360/62; 360/135; 360/55
[58] Field of Search .............................. 369/275.2, 275.3; 360/61, 62, 63, 67, 77.05, 60, 135, 55, 77.08

[56] References Cited

U.S. PATENT DOCUMENTS

| 5,119,291 | 6/1992 | Flannagan et al. ...................... 395/275 |
| 5,150,339 | 9/1992 | Ueda et al. ...................... 369/275.2 X |
| 5,296,995 | 3/1994 | Yonezawa et al. ................... 360/55 X |
| 5,402,278 | 3/1995 | Morita .................................. 360/77.05 |
| 5,457,583 | 10/1995 | Kaneko ...................................... 360/63 |
| 5,497,367 | 3/1996 | Yamagami et al. .................. 369/275.2 |

FOREIGN PATENT DOCUMENTS 6-68444  3/1994  Japan .

*Primary Examiner*—Aristotelis M. Psitos
*Assistant Examiner*—Alan Faber
*Attorney, Agent, or Firm*—Limbach & Limbach L.L.P.

[57] ABSTRACT

A magnetic disc having a ROM area and a RAM area which are separated. The ROM only plane and the RAM only plane are separated on the magnetic disc.

27 Claims, 9 Drawing Sheets

MAGNETIC DISC WITH A FLAT RAM AREA AND DISC DEVICE

BACKGROUND OF THE INVENTION

1. Field of the Invention

The present invention relates to a magnetic disc and a disc device, and is applicable to devices to be used in a computer memory system, for example.

2. Description of the Related Art

As a recording medium of ROM/RAM mixed type to be used in the memory device of computers, the magneto-optical (MO) disc is well known. Large quantities of user data can be written in the RAM area in utilizing this MO.

In this connection, a magnetic head is used for recording the data in the RAM area and the optical characteristic (e.g., a phenomenon wherein the reflection angle deviates depending on the magnetic direction (Kerr effect)) is used for reading the data. Furthermore, regarding the signal read out from the ROM area, a method to read out optically the information of land and groove pit lines formed on the substrate (e.g., intensity of reflection changes) is used. Thus, an optical pickup device becomes necessary to read out the information.

However, there has been a problem that the driving device is relatively large sized and of a very heavy weight due to the optical pickup device for read out. Also the consumption of electricity increases in the case of transferring this large sized pickup for the recording medium.

Furthermore, in various storage media including the existing MO, it has been a problem that the reading speed has not been satisfactory for the storage device system in the computer.

On the other hand, a hand disc drive, i.e. HDD (magnetic storage device) can record relatively large quantities of data and reading and writing can be done with a subminiature magnetic head, the device can be small size and it consumes very little electricity. Besides, very high reading/writing speed can be realized.

However, it has been a problem that the user might erase the data by mistake in the ROM mode in the conventional HDD in which data is prewritten and distributed to the user.

SUMMARY OF THE INVENTION

In view of the foregoing, an object of the present invention is to provide a magnetic disc capable of minimizing the possibility of a users' erasing the read only ROM data of the ROM area as small as possible and improving the safety.

Another object of the present invention is to provide a disc device of smaller size having a smaller consumption of electricity and faster reading/writing speed than before.

The foregoing object and other objects of the present invention have been achieved by the provision of a magnetic disc 21, 51 wherein: a plurality of tracks each of which is divided into a plurality of segments are provided, said each segment being divided into servo areas 15 to record servo information and data recording areas 16 to record data information. The servo areas 15 and first data recording areas for read only are provided at least on one surface (ROM plane) on one or a plurality of discs stacked upon each other, and second data recording areas to write and read data which are formed by flat magnetic layer are provided on the other surface (RAM plane) on the one or a plurality of disc.

Further, in the present invention, a magnetic disc 61, 71 is provided wherein: a plurality of tracks each of which is divided into a plurality of sectors are provided, each sector being divided into servo areas 15 to record servo information and data recording areas 16 to record data information; and a read only area (ROM area) comprising the servo areas 15 and the data recording areas 16 formed collectively as land and groove pit lines and a write and read area (RAM area) formed by flat magnetic layer are mixed together on the same surface.

Further, the present invention realizes a disc device comprising: driving means for turning magnetic discs 21, 51 on which a plurality of tracks each of which is divided into a plurality of segments are provided, each segment being divided into servo areas 15 to record servo information and data recording areas 16 to record data information, and the servo areas 15 and first read only data recording areas are provided at least on one surface (ROM plane) on one or a plurality of discs stacked upon each other, and also second write and read data recording areas formed by flat magnetic layer on the other surface (RAM plane) are provided; a first reproducing head 32 for reproducing data magnetically from the read only surface to be used for reproducing in said magnetic disc 21, 51; a recording head 34A for recording data on the write and read surface to be used for recording and reproducing the magnetic disc; and a second reproducing head 34B for reproducing data from said write and read surface magnetically.

Since the ROM plane and the RAM plane are arranged separately, the possibility that the information on the ROM surface would be erased by the user can be eliminated. And thus, the magnetic disc having a mixed ROM area and RAM area mixed can be realized.

Moreover, in the case of forming the ROM area and the RAM area on the same surface, by inputting the write protect information by land and groove pits on the ROM part, a magnetic disc capable of reading and writing the data safely and having the ROM area and the RAM area on the same surface can be realized.

Furthermore, since both the ROM plane and RAM plane allow read out of the information magnetically, the reproduction system can be small sized. As a result, the device can be realized which is mini-sized, simplified and has a low consumption of electricity.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) Magnetic Disc

Figure 1:
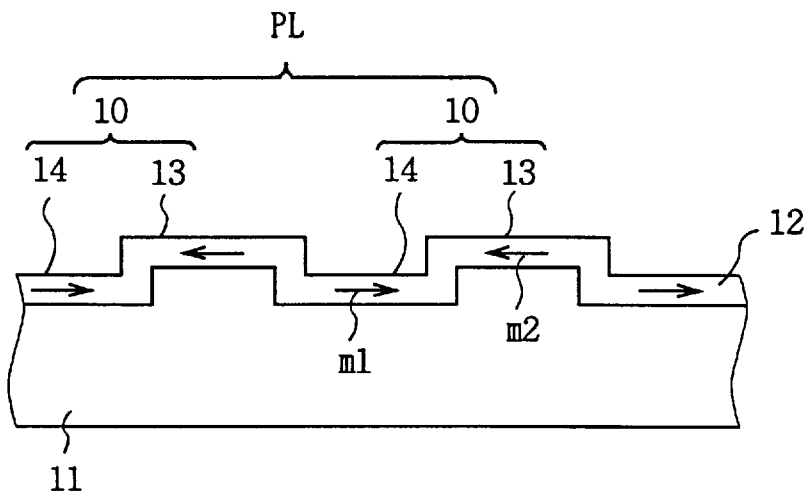
FIGS. 1 and 2 are brief sectional views showing an example of the magnetic disc according to the present invention.
Figure 2:
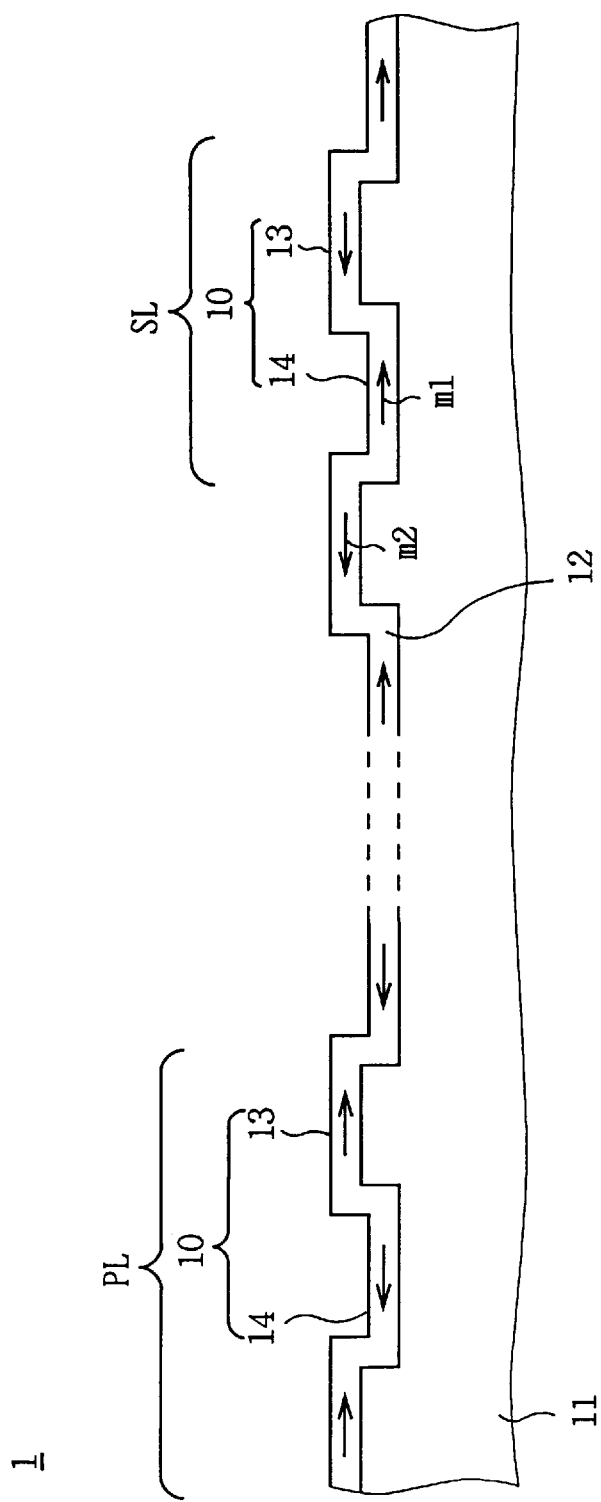

In the present invention a non-magnetic substrate 11 on which magnetic head positioning pit lines are formed will be provided as shown in FIGS. 1 and 2. Here, FIG. 1 is an example of non-magnetic substrate 11 on which land and groove pit lines for tracking servo signal PL is formed as positioning pit lines, and FIG. 2 is an example of non-magnetic substrate 11 on which information land and groove pit lines SL are formed together with the positioning land and groove pit lines PL. And magnetic layer 12 is formed on the non-magnetic substrate 11 and this is used as the magnetic disc 1.

Figure 3:
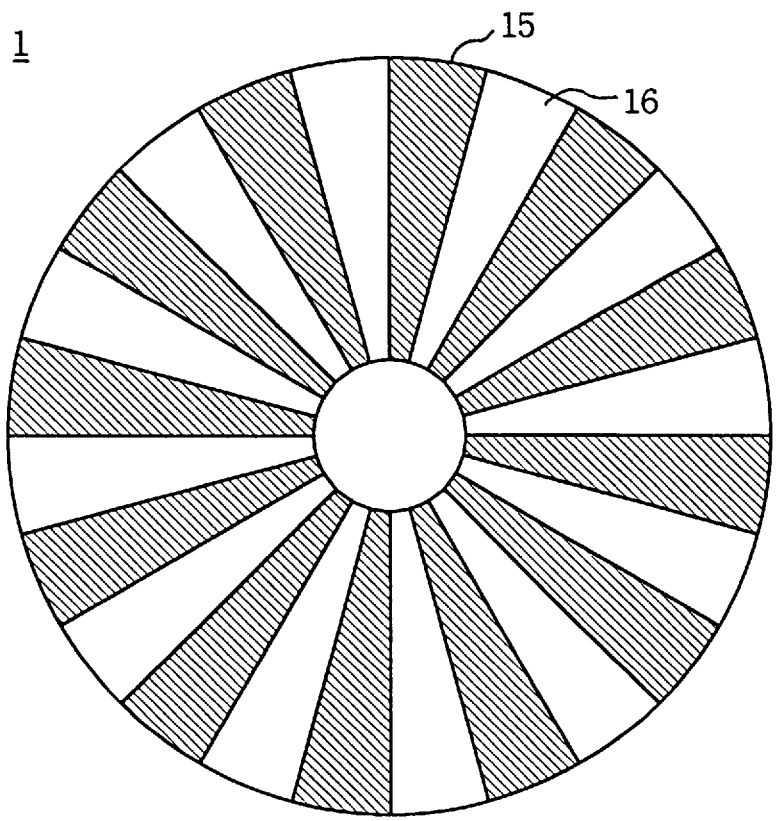
FIG. 3 is a schematic plane diagram explaining the sampled servo system.

In this connection the magnetic disc 1 of each example, as its pattern is shown in FIG. 3, adopts the sampled servo system having the fan shaped positioning signal recording area (servo area 15) on the magnetic disc 1. The areas between these servo areas 15 will be information recording areas 16.

However, as the servo system, it is needless to say that the present invention can be applied to various tracking servo systems, such as the mode to write in positioning signal and information signal, or positioning signal will be written in the entire area, i.e., servo surface servo system.

Figure 4:
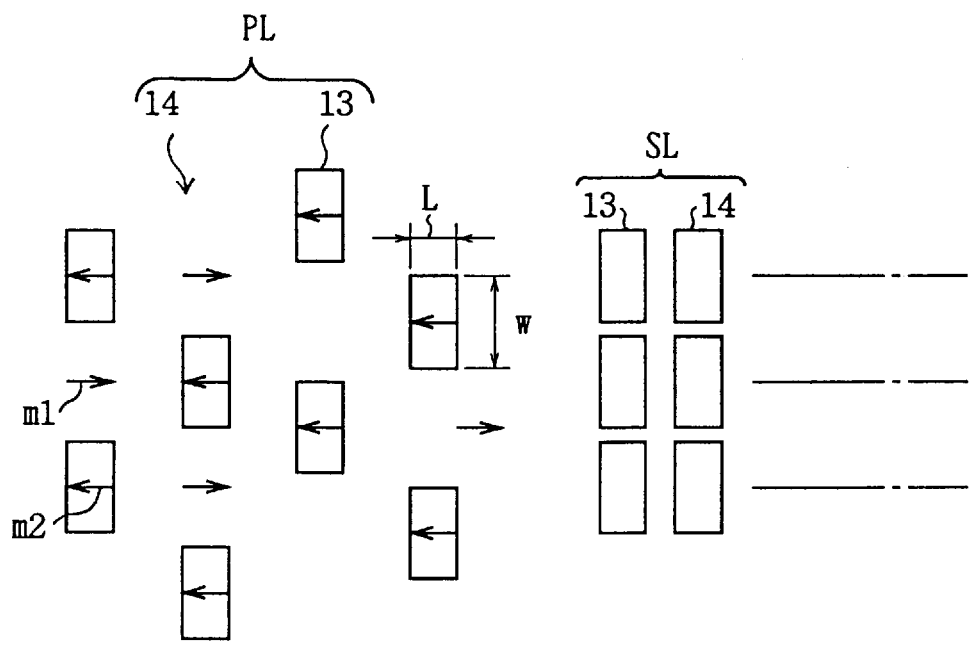
FIG. 4 is a schematic plane diagram explaining the land and groove patterns.

Then, in the case of a magnetic disc 1 which is constituted as shown in FIG. 3, the servo areas 15 are arranged at regular angular intervals along the circumference and approximately several hundreds per one circle are arranged. And as shown in FIG. 4, the positioning land and groove pit lines PL are arranged on this servo areas 15.

Furthermore, as shown in FIG. 2, information land and groove pit lines SL are formed sequentially by the positioning land and groove pit lines PL in the information recording areas 16.

These pit lines will be formed when the upper faces of rectangles, i.e., land parts 13, each having the length in the direction of track width W: approximately 5 ($\mu$m) and the length along the disc running direction L: approximately 0.6–2.9 ($\mu$m) for example, are formed in pattern corresponding to signals.

Figure 5:
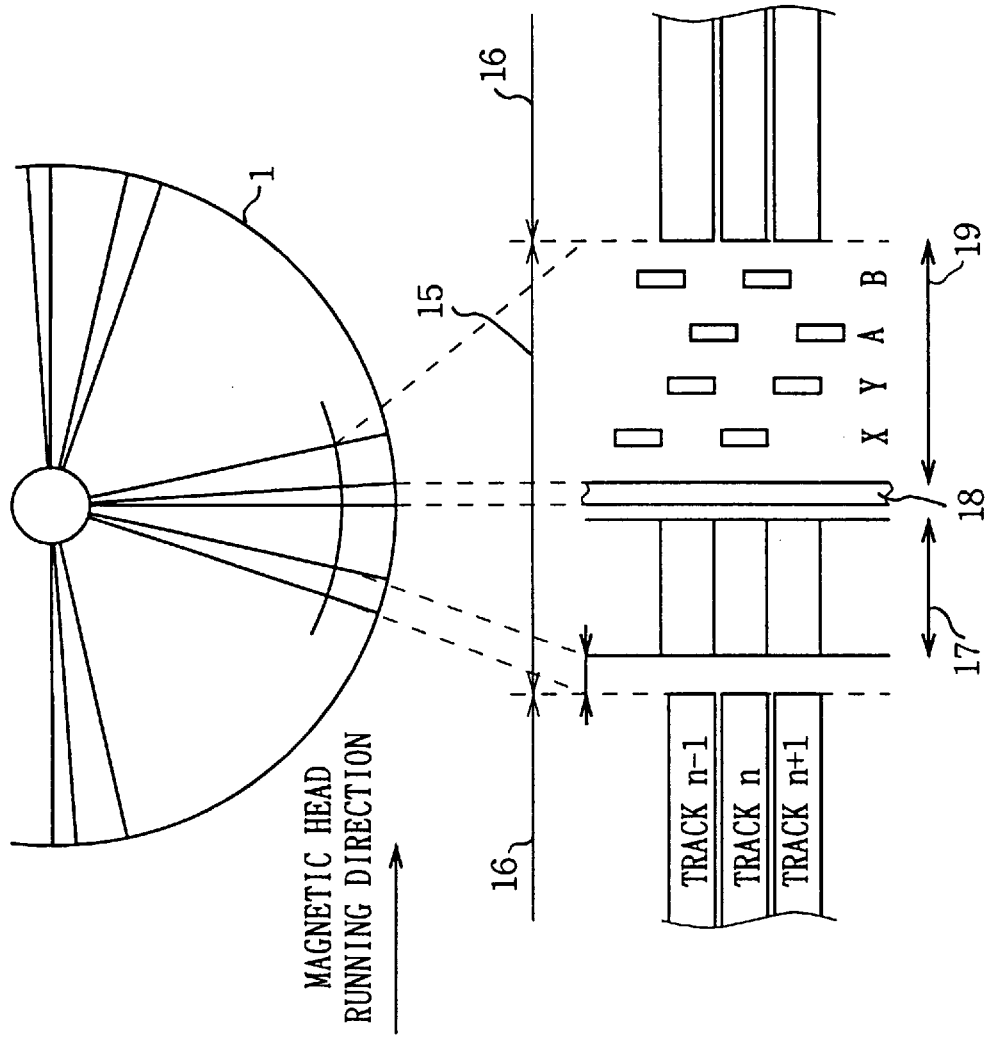
FIG. 5 is a schematic diagram explaining the neighborhood of servo area of the sampled servo system.

A detailed diagram of servo area 15 will be shown in FIG. 5. At this point, peak existing time of regenerative isolated waveform of the clock pit 18 is to give the clock information synchronized with the disc rotation to the data system and servo system.

Furthermore, the access pattern 17 becomes necessary at the track seek mode when transferring the head to the target track among positioning servos of the magnetic head and this is the pattern on which each track has a different length and disposition so that each track becomes unique by the coding the track address.

Moreover, the fine pattern 19 becomes necessary at the tracking mode to position the head correctly on the center of the target track in the magnetic head positioning servos and these are patterns to show the relative position of the head to the track. These are formed of four magnetic patterns A, B, X and Y.

As the land and groove patterns 10 forming method on the non-magnetic substrate 11, various known methods, such as the RIE (reactive ion etching) method by photo-lithography, land and groove pattern formation by the stamper and glass 2P (photo-polymer) method can be applied. Then, magnetic layer 12 will be formed on these land and groove patterns 10 and by magnetizing these through the first and the second magnetizing processes, magnetic disc 1 can be formed.

Here, the first magnetizing process is the process to magnetize the entire face of magnetic layer 12 (i.e., the bottom face (grooved part) 14 and the upper face (land part) 13) in one direction (e.g., m1), and the second magnetizing process is the process to magnetize the upper face (land part) 13 in the opposite direction (e.g., m2), as shown in FIG. 4. These magnetizing processes are realized by means of the methods disclosed in Japanese Patent Laid-open No. 6-68444, for example.

The embodiments of the magnetic disc 1 formed according to the foregoing construction will be hereinafter described.

(2) First Embodiment (2-1) Magnetic Disc

Figure 6:
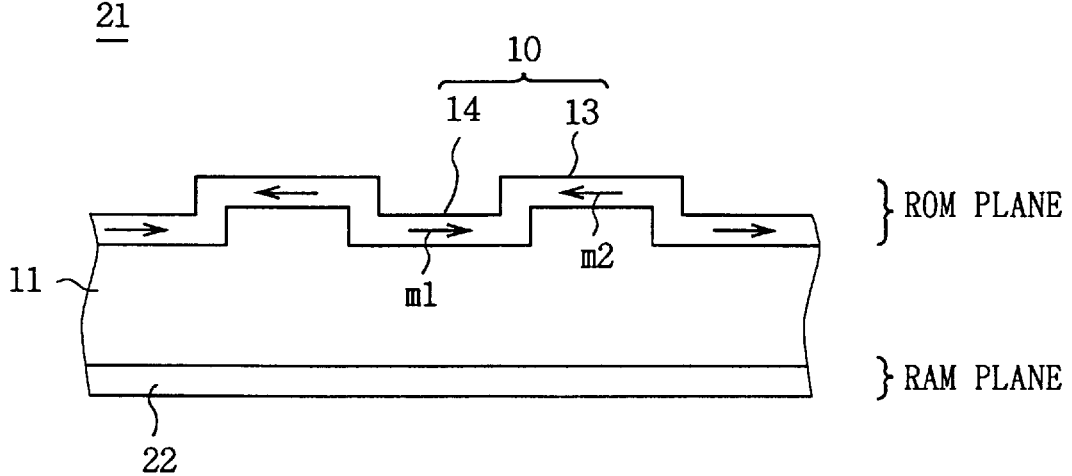
FIG. 6 is a brief sectional view showing an example of the magnetic disc according to the present invention.

First of all, magnetic disc 21 having land and groove pits on the entire face of the disc will be described. In this example, as shown in FIG. 6, a positioning servo signal and a data information signal to forbid miserasing of such as a program for operating system (OS) are formed as land and groove pit lines on the non-magnetic substrate 11. This face becomes the ROM plane. The magnetic layers layered on the land part and grooved part are magnetized in the opposite directions from each other and this information can be reproduced by the magnetic head.

And at the time when the disc surface is formed as described above, the reverse surface forms an ordinary sequential flat magnetic layer area 22 and this becomes a recordable surface by the magnetic head. More specifically, the reverse surface of this disc becomes the RAM plane.

The information of ROM plane will be read by the reproducing head. The information of RAM plane will be read and written by the recording and reproducing head or the recording head and the reproducing head.

(2–2) Disc Device

Figure 7:
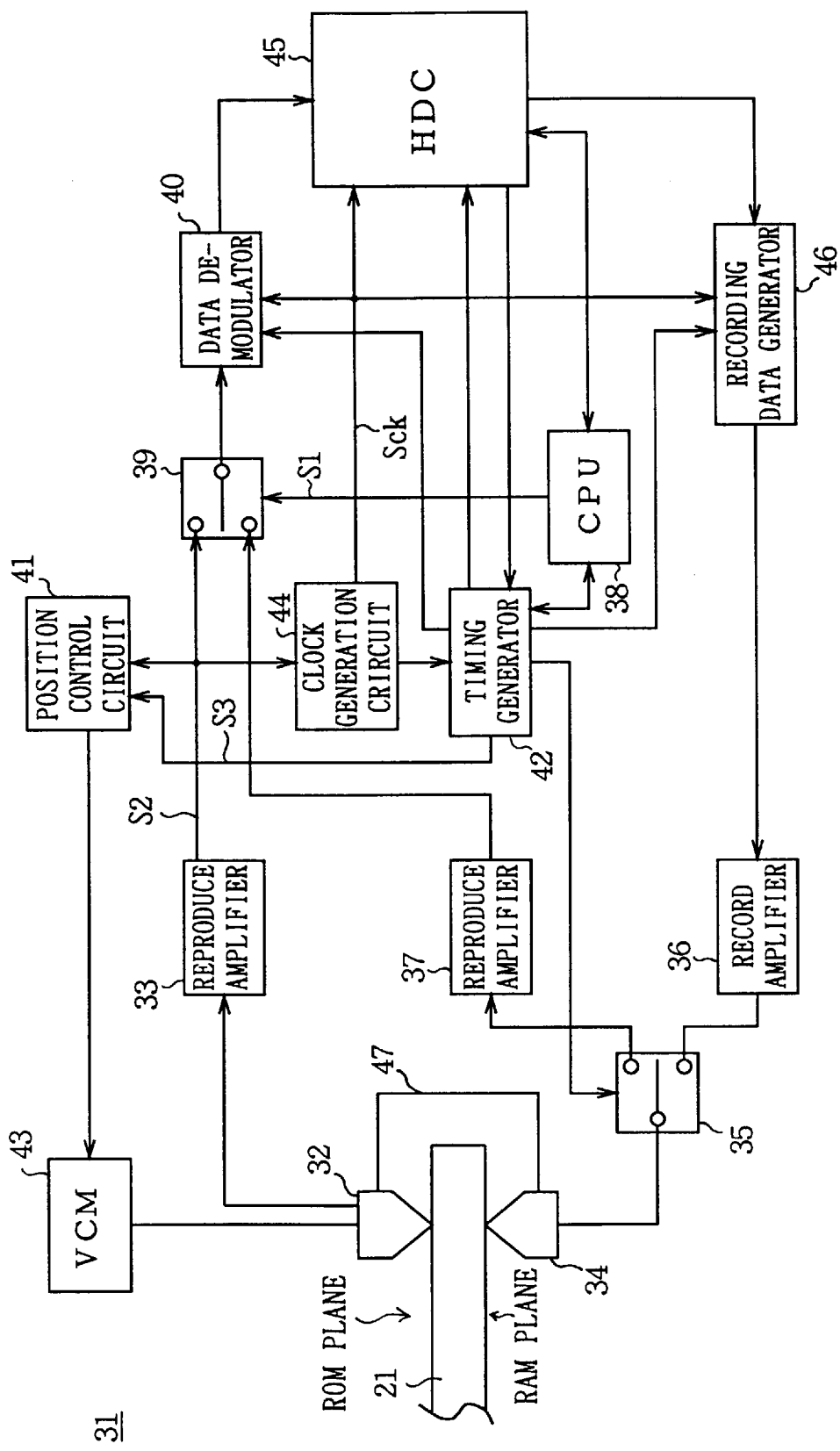
FIG. 7 is a block diagram showing an example of the magnetic disc according to the present invention.

Referring to FIG. 7 the construction and functions of circuits for recording and reproducing will be described. FIG. 7 shows the construction of circuits of the disc device 31. In this embodiment a reproducing amplifier 33 is equipped for information read only from the ROM plane, and a recording amplifier 36 and a reproducing amplifier 37 for recording the information on the RAM plane and reading out the information from the RAM plane are arranged respectively in addition to the reproducing amplifier 33 on the ROM plane. The reproducing head 32 is arranged facing to the ROM plane and moves extending from the inner track to the outer track of the disk together with the recording and reproducing head 34 facing to the RAM plane by an arm 47.

In the case of reproducing the information of ROM plane, firstly the CPU 38 outputs a switching signal S1 to a ROM/RAM plane shifting switch 39 and controls in order that the signal reproduced from the ROM plane will be given to a data demodulation circuit 40. Thus, the reproduced signal S2 after being read out through the reproducing head 32 and amplified at the reproducing amplifier 33 is inputted to the data demodulation circuit 40. At this point, the reproduced signal S2 is also sent simultaneously to a position control circuit 41.

The position control circuit 41 receives a servo gate signal S3 supplied from a timing generation circuit 42, and reproduces the signal from the positioning land and groove pit lines PL depending on said servo gate signal p3. Then, the position control circuit 41 drives a voice coil motor (VCM) 43 depending on the reproduced result and controls positions of the reproducing head 32 and the recording and reproducing head 34. At this point, a clock generation circuit 44, supplied with signal S2, obtains the clock information from the clock pit installed in the servo area 15 and by frequency-dividing, generates data clock $S_{CK}$. This data clock $S_{CK}$ is supplied to the recording and reproducing circuit system, i.e. the data modulation circuit 40, a hard disc controller 45 and a recording data generation circuit 46.

In the case of recording or reproducing the information on the RAM plane, firstly the CPU 38 controls the ROM/RAM plane shifting switch 39 to connect the RAM plane and the data demodulation circuit 40. At this point, signals read out from the RAM plane through the recording and reproducing head 34 and recording/reproducing shifting switch 35 and amplified at the reproducing amplifier 37 is inputted to the data demodulation circuit 40. In this case, the reproducing amplifier 33 for the ROM plane is kept active and reproduces the information from the positioning land and groove pit lines PL arranged on the ROM plane and conducts the head positioning control in the same manner as described above.

At the same time, the clock generation circuit 44 obtains clock information from the clock pit installed in the servo area 15 on the ROM plane and changes the frequency dividing ratio, and generates a data clock for the RAM plane and supplies it to the recording and reproducing circuit system, including the data demodulation circuit 40, the hard disc controller 45 and the recording data generation circuit 46.

Shifting of the data recording/reproducing on the RAM plane is conducted when the timing generation circuit 42 generates the signal to switch over the recording/reproducing shifting switch 35 based on the information of the hard disc controller (HDC) 45.

According to the foregoing construction, the magnetic disc having the ROM and RAM mixed, which was difficult to have in terms of safety and productivity in a conventional magnetic disc can be realized. This is because the ROM only surface and the RAM only surface are arranged separately and only the reproducing head is required for the ROM only surface but the recording head is not needed. Thus, the safety can be increased and the quantitative production method can be formed.

Furthermore, since the servo control and generation of data clock on the RAM plane are conducted depending on the reproducing signal read out from the pit arranged on the ROM only surface, the data on the RAM only surface can be used for recording only. Thus, the effective usability of the RAM only plane can be remarkably improved.

Moreover, since the information recording and reproducing can be done by magnetic means such as the magnetic head, speeding up of recording and reproducing speed, simplifying the device construction, miniaturizing the size and lowering the consumption of electricity as compared with the case of using the optical reproducing device can be realized.

(3) Second Embodiment

Figure 8:
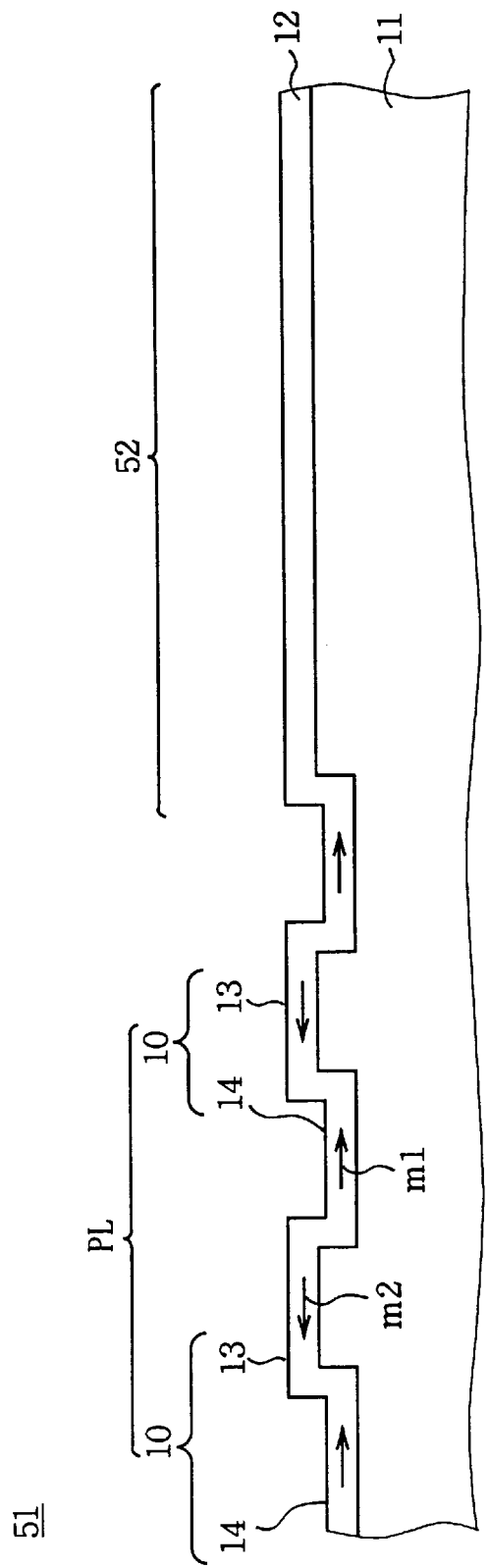
FIGS. 8 and 9 are brief sectional views showing an example of the magnetic disc according to the present invention.

According to this embodiment as shown in FIG. 8, information land and groove pit lines SL of the ROM plane is formed by a flat magnetic layer area 52 instead of being formed by land and groove pits like the magnetic disc 21 of the first embodiment.

In the case of this embodiment, servo information is formed by land and groove pits, and after the magnetic layer is formed, the magnetic disc 51 is placed on the data recording device and data is written in.

The rest of the construction of the magnetic disc 51 and the overall construction of the disc device to record and reproduce the magnetic disc 51 are the same as those of the first embodiment. In the case of this embodiment, since no recording head exists on the ROM plane, there is no possibility that the data written in the flat magnetic layer would be erased.

Moreover, according to this embodiment, since the ROM information is written by the ordinary magnetic recording, the length per bit can be approximately 0.02–0.05 ($\mu$m), and this means that dozens of times higher density than the first embodiment can be achieved. In this connection, in the case of the first embodiment, since the length L per bit along the running direction is determined by the limit of pit forming accuracy, L is in the neighborhood of 0.6–2.9 ($\mu$m).

According to the foregoing construction, the RAM only plane can be used for the data recording only in the same manner as in the case of the first embodiment and effective usability of the RAM only plane can be remarkably improved.

Moreover, since the data recording and reproducing can be done by the magnetic means using the magnetic head, higher speed and simplification and miniaturization of the device and lower consumption of electricity can be realized as compared with the case of using the optical device described in the opening paragraph.

(4) Third Embodiment (4-1) Magnetic Disc

In this embodiment the whole surface of servo signal and a part of information signal is formed as land and groove pit lines. This is an example of the case where the area is divided into ROM plane and RAM plane at the radial direction.

Figure 9:
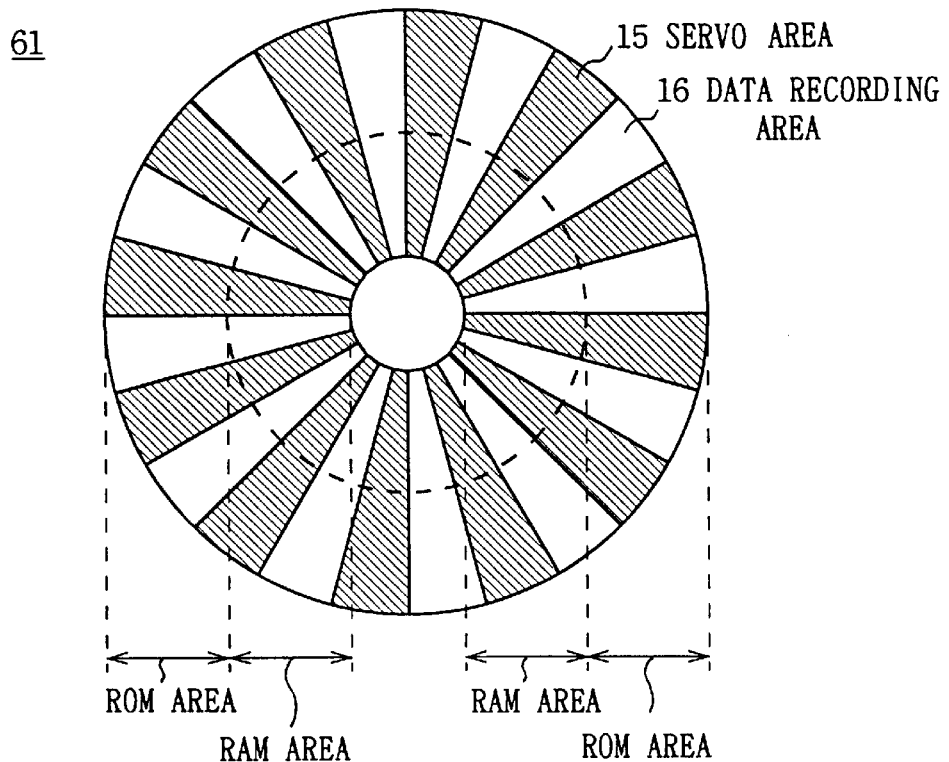

FIG. 9 shows an outline of this embodiment. In this embodiment the upper surface of the disc 61 is divided into two areas in the radial direction, the inner track side is the RAM plane and the outer track side is the ROM plane.

Here, the construction of FIG. 2 is adopted as the ROM area and both the positioning servo area and the information area is formed by the land and groove pits.

Moreover, as the RAM area, the construction of FIG. 3 is used. This RAM area is formed by continuous flat magnetic layer 52 (FIG. 8) similar to that of the ROM area except servo area. This flat magnetic layer 52 is used as the information recording area.

Furthermore, in order not to erase the data of ROM area, write protect/writable information P is formed as the land and groove pits at a predetermined position of the servo area 15. In this case, the write-protect/writable information P is recorded so as to be detected at the timing synchronized with the clock information which is extracted from the reproducing information of the servo area 15 (clock pit). In the contrast, the write-protect/writable information having an unique pattern may be formed extending over the whole servo area 15.

(4-2) Disc Device

Figure 10:
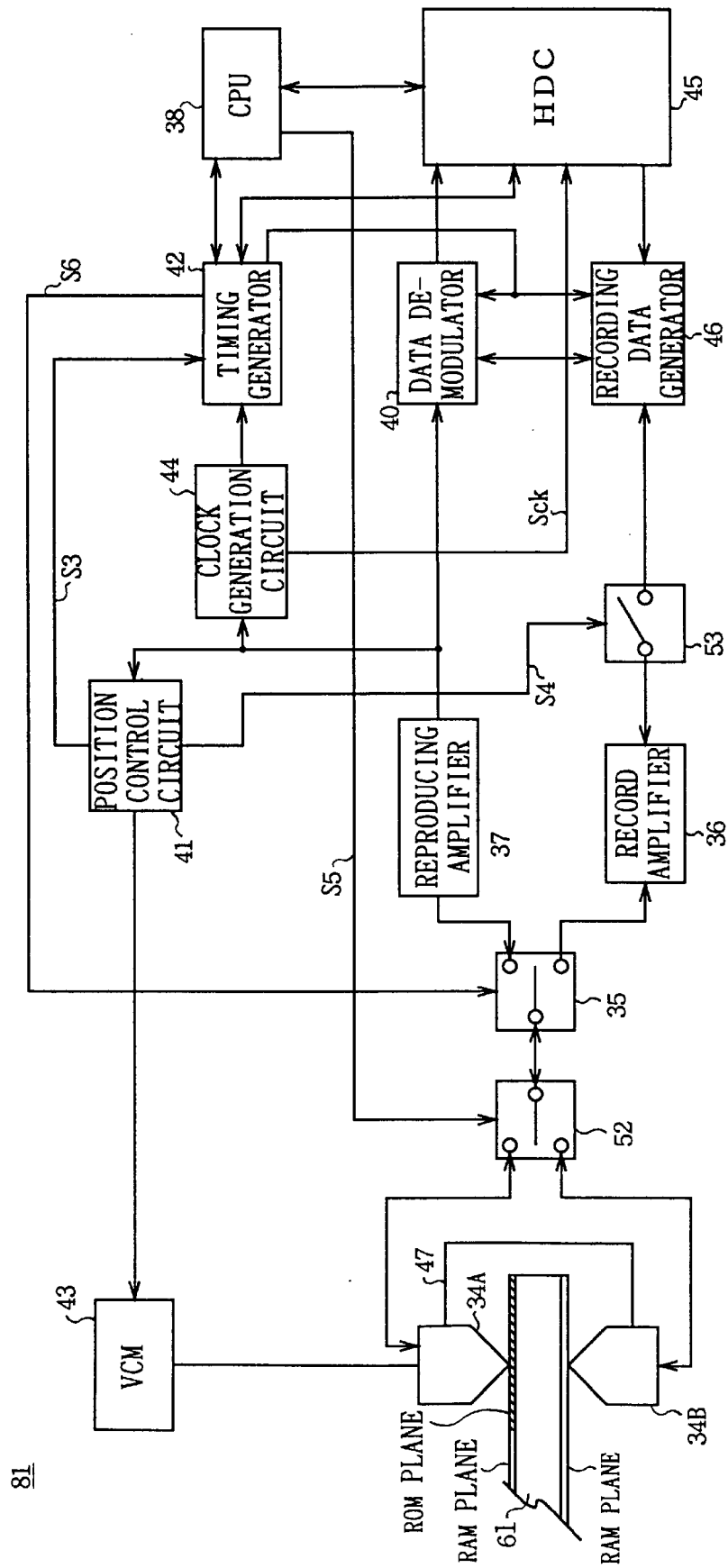
FIG. 10 is a block diagram showing an example of the disc device according to the present invention.

A disc device f or recording to and reproducing from the magnetic disc of this third embodiment will be described hereinafter. FIG. 10 shows a circuit structure of disc device 81. The above magnetic disc 21 (FIG. 9) is arranged within the disc device 81. Note that, the parts having the same function as the disc device 31 shown in FIG. 7 have the same reference numerals to omit the description.

On the upper surface of the magnetic disc 61, the RAM area is formed at the inner track side and the ROM area is formed at the outer track side and also the recording/ reproducing head 34A is arranged facing to the upper surface. On the entire under surface of the magnetic disc 61, the RAM area capable of writing or rewriting is formed, and the recording/reproducing head 34B is arranged facing the under surface. These recording/reproducing heads 34A and 34B are connected to two fixed connects which are provided at the side shifting switch 52, respectively. The movable connect of the side shifting switch 52 is connected to the movable connect of the recording/reproducing shifting switch 35. Besides, a gate circuit 53 to forbid writing to the ROM area on the magnetic disc 61 is arranged between the recording amplifier 36 and the recording data generation circuit 46.

In the case of recording an information signal on the upper surface of the magnetic disc 61, first the CPU 38 outputs a switching signal S5 to the side shifting switch 52. At the same time, the timing generation circuit 42 generates a switching signal S6 to switch the recording/reproducing shifting switch 35 to the reproducing side, based on the recording command from the CPU 38 and the control information from the hard disc controller (HDC) 45. Thereby, the signal reproduced from the upper surface of the magnetic disc 61 is supplied to the data demodulation circuit 40 via the reproducing amplifier 37. This reproduced signal S2 is also supplied to the clock generation circuit 44 in a manner similar to the above-described embodiments. In the clock generation circuit, data clock Sck to make each circuit synchronize is generated. At the timing generation circuit 42, a servo gate signal S3 which is supplied to the position control circuit 41 is generated based on the data clock Sck. Further, at the timing generation circuit 42, the switching signal S6 is outputted based on the data clock Sck and the recording/reproducing shifting switch 35 is switch-controlled in order to perform reproduction of the data from the servo area 15 and recording of the data to the information recording area 16. On the contrary, the position control circuit 41 decodes write protect/writable information which has been recorded to the specific area P of the servo area, and generates a gate signal S4 to forbid writing in based on the information. The gate circuit 53 cuts off the flow of the signal to the recording/reproducing head 34A so as to prevent misrecording of the recording data from the recording data generation circuit 46 to and erased from the ROM area. As a consequence, the recording data is certainly recorded to the data recording area in the RAM area.

The operation of the recording amplifier 36 may be stopped by the CPU 38, and also writing to the ROM area may be forbidden by controlling the recording/reproducing shifting switch 53, without providing the gate circuit 35 as in the above-described embodiments.

According to the foregoing construction, since the write protect information is inputted to the ROM area formed on the same surface as the RAM area by the land and groove pits and thus making the data not to be rewritten, the magnetic disc capable of having both ROM area and the RAM area on the same surface can be obtained.

(5) Fourth Embodiment

Figure 11:
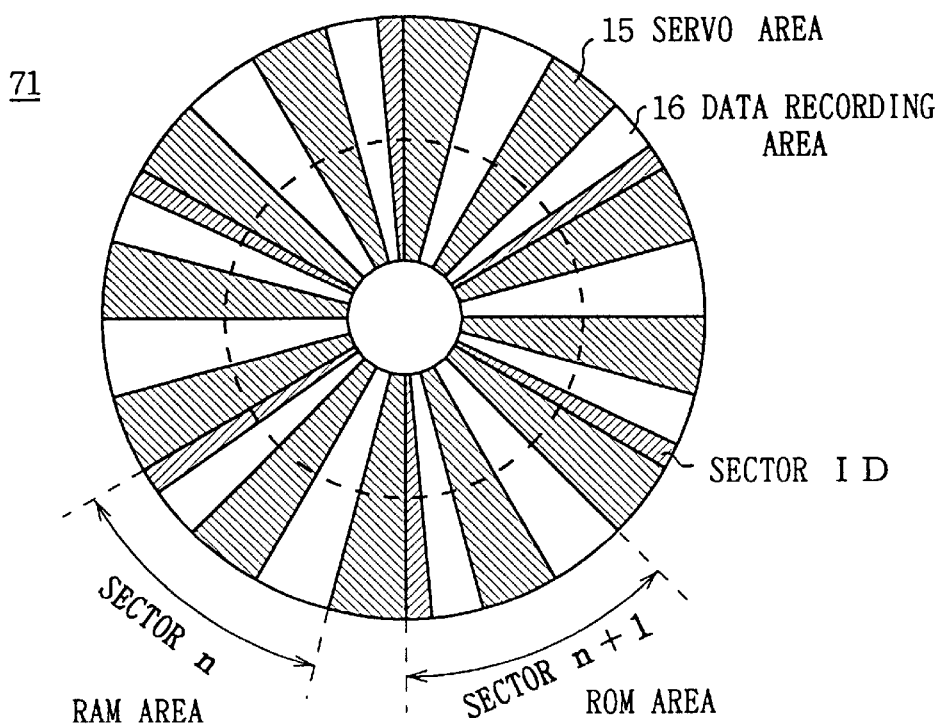
FIG. 11 is a schematic plane diagram showing an example of the magnetic disc according to the present invention.

In this embodiment the overall surface servo signal and a part of the information signal are formed as the land and groove pit lines in the same manner as that of the third embodiment. However, according to the fourth embodiment, the disc 1 is not divided in the radial direction but the disc 1 is divided into the ROM area and the RAM area per sector as shown in FIG. 11.

In this case, write protect/writable information is formed on the part of information of the sector ID area by land and groove pits in synchronization with forming the land and groove pit lines of servo information for example. The hard disc controller (HDC) judges the ROM area and RAM area from this information and stops and restarts the write-in. Moreover, a gate signal to mask the write-in to the ROM area may be generated making the timing generation circuit 42 (FIG. 10) hold the information on the whole areas covering a circle.

The circuit construction in the fourth embodiment is not different from the ordinary sampled servo magnetic disc device.

According to the foregoing construction, the magnetic disc on which the ROM plane and RAM plane are mixed in the same manner as in the case of the third embodiment can be realized.

(6) Other Embodiments

In the first and second embodiments, the magnetic layer is formed on the flat disc as the RAM plane. However, the present invention is not only limited to the above but also servo information may be formed by pits, or only clock information among the servo information may be formed by pits. In this case, effective usability of data on the RAM plane decreases but since positioning and clocking are conducted based on the information from said plane, its accuracy can be improved and can cope with the change of time elapsed.

In the third and fourth embodiments, write protect/ rewritable information is recorded on the servo area or on the preformed sector ID. However, the present invention is not only limited to the above but also a gate signal to mask the write-in signal to the ROM area by such as the timing generation circuit may be generated. Moreover, the management of the whole circuit system can b e conducted more strictly by the CPU regarding the data write-in.

In this case, by coding the position of rewritable area and recording on the specific ROM area, that area can be read and put in the CPU memory each time the magnetic disc device is actuated.

Figure 12:
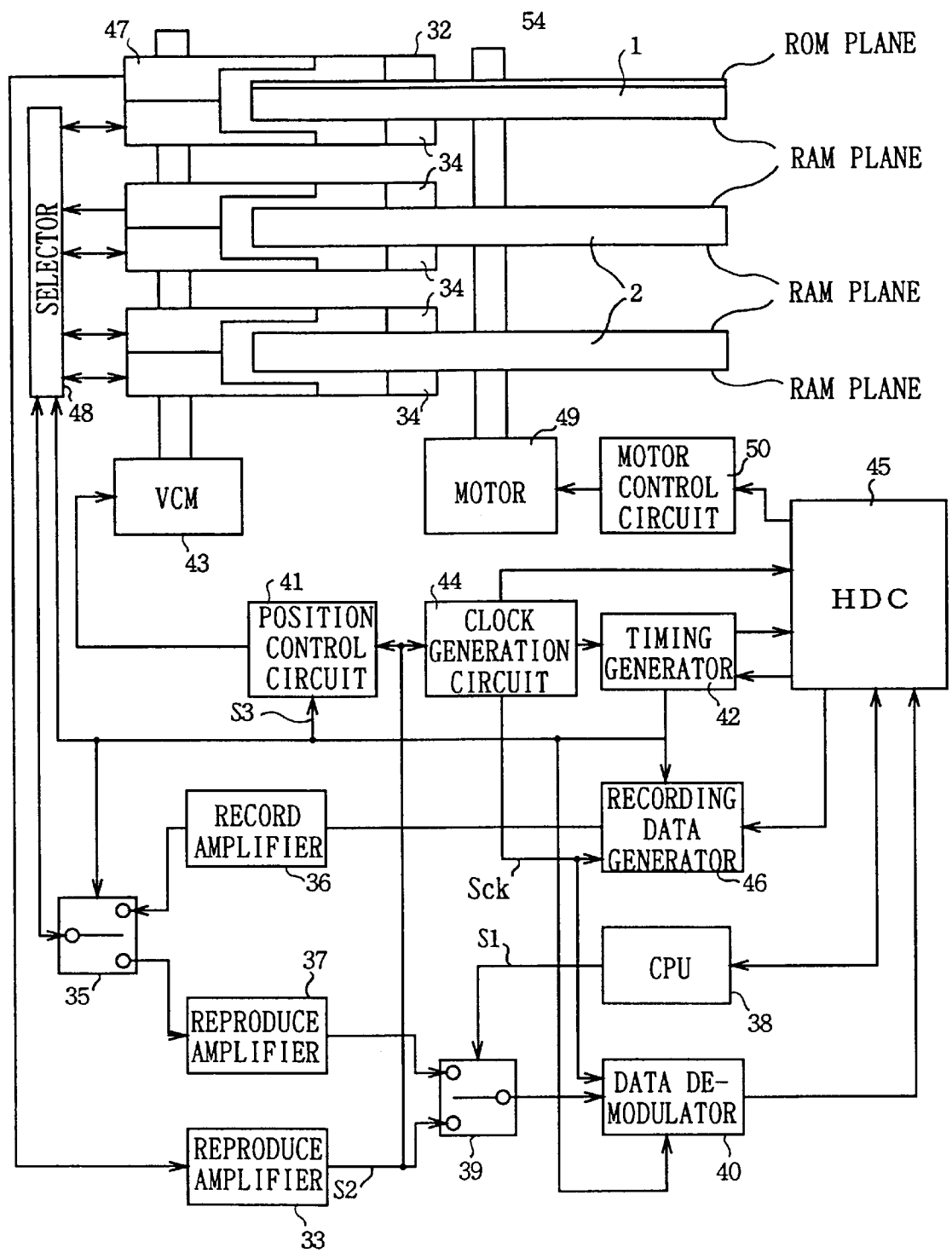
FIG. 12 is a block diagram showing an example of the disc device according to the present invention.

Moreover, in the embodiments described above, one disc is used in the disc device, however, any number of discs can be used. FIG. 12 shows a disc device 91 in which three magnetic discs are used, for example. The configuration of this disc device 91 will be described hereinafter accompanying with FIG. 12. Note that, as to the parts having the same function as the disc devices 31, 81 shown in FIGS. 7 and 10, the description will be omitted by adding the same reference numerals.

On the upper surface of the magnetic disc 1, the ROM area having the servo area 15 and the data recording area 16 is formed as the ROM plane, and on the other two magnetic discs 2, the RAM plane is formed on both the upper and the under surfaces. These three magnetic discs 1 and 2 are stacked up so as to face the respective surfaces of each other with the specific interval. These are fixed to a rotary shaft 54 in the state of stacking. The rotary shaft 54 is rotary driven by a motor 49 so that three magnetic discs turn at the same time. The motor 49 rotates with a constant angular velocity by control of rotation by a motor controller 50 in accordance with a command of rotation from the hard disc controller (HDC) 45. Recording/reproducing heads 34 are arranged so as to face to the under surface (RAM plane) of the magnetic disc 1 and both the upper and the under surfaces (RAM planes) of the magnetic discs 2, respectively. Input and output of signals to these heads are conducted via a selector 48.

The operation of the disc device 91 of this embodiment will be described hereinafter. The disc device 91 is built in the host system of personal computers etc, for example. The hard disc controller (HDC) 45 is capable of sending and receiving commands and information to and from the host main processor (not shown). Namely, the hard disc controller (HDC) 45 and the host computer are connected each other with a bus such as SCSI. If a starting command of the disc device 91 is sent to the CPU 38 via the hard disc controller (HDC) 45, the CPU 38 outputs a command of driving the motor 49 and a command of reproducing a data recording area 16 which is provided on the ROM plane of the magnetic disc 1 to the hard disc controller (HDC) 45. In this case, information which is necessary for operating the host computer, such as a program as an operating system (OS) and a basic software managing an interface to the circumference equipment is recorded in the data recording area 16. The hard disc controller (HDC) 45, before reproducing these information, outputs a control signal to rotate the motor 49 to a motor control circuit 50 corresponding to the command from the CPU 38, and also controls a timing generation circuit 42 so that clock information is reproduced based on clock pits provided on the servo area 15 on the upper surface of the magnetic disc 1. Besides, the CPU 38 outputs a switch signal S1 to a ROM/RAM plane shifting switch 39, therefore, a reproducing signal S2 from the data recording area 16 is supplied to a data demodulation circuit 40, a position control circuit 41 and a clock generation circuit 44 through a reproducing amplifier 33. A method of positioning control of a VCM 43 and a method of switching control of recording/reproducing are similar with the above-mentioned disc devices. The reproducing signal S2 decoded at the data demodulation circuit 40 is sent to the host computer via the hard disc controller (HDC) 45 as OS information. The host computer performs the next operation such as loading of an application program based on this information, for example.

According to the above configuration, since the servo signal has been recorded on one side of a disc, the other discs can be effectively used as recording and reproducing discs. Besides, since the surface which has been provided as the servo area is prescribed as a surface exclusive to the reproducing (ROM plane), it does not need a recording head, thus it can be prevented that data is recorded and erased errornously to or from the disc. Further, on the ROM plane, since a data recording area 16 to record information exclusive to reproducing such as an OS program is provided along with the servo area, this ROM plane can be effectively used.

Note that, in the above-mentioned embodiments, the magnetic discs 61, 71 which are shown in FIGS. 9, 11 respectively may be used instead of the magnetic disc 1. It is easily understood that the configuration of the disc device in this case by the above description. Further, a plural pieces of discs having the ROM area may be provided without limiting to one disc.

Moreover, according to the present invention as described above, since both ROM plane and RAM plane become capable of reading out the information magnetically, a mini-sized disc device having low consumption of electricity can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A magnetic disc wherein:
    a plurality of tracks are provided, each track is divided into a plurality of segments and each segment is divided into servo areas to record servo information and data recording areas to record data information; and
    said servo areas and first data recording areas for read only are provided at least on one surface on one disc or a plurality of discs stacked upon each other, and second data recording areas to write and read data which are formed by a flat magnetic layer are provided on the other surface of the one disc or each of the plurality of discs.
2. The magnetic disc according to claim 1, wherein said first data recording areas and said servo areas are formed in one block as land and groove pit lines.
3. The magnetic disc according to claim 1, wherein said first data recording areas are formed as flat magnetic layer areas and data are written in said areas in advance.
4. The magnetic disc according to claim 1, wherein the surface having said servo areas is a surface for read only.
5. The magnetic disc according to claim 1, wherein said first data recording areas are separated and arranged with respect to the second data recording areas in the radial direction.
6. The magnetic disc according to claim 5, wherein information to show write protect is recorded on said servo area.
7. The magnetic disc according to claim 5, wherein said first data recording areas are separated and arranged per segment with respect to the second data recording areas.
8. The magnetic disc according to claim 7, wherein a segment discrimination area is preformed by land and groove pits and information to show write protect is recorded on said segment discrimination area.
9. A disc device comprising:
    driving means for turning magnetic discs on which a plurality of tracks, each of which is divided into a plurality of segments, are provided, said each segment is divided into servo areas to record servo information and data recording areas to record data information, and said servo areas and first read only data recording areas are provided at least on one surface in one disc or a plurality of discs stacked upon each other, and also second write and read data recording areas formed by a flat magnetic layer on another surface of the one disc or each of the plurality of discs are provided;
    a reproducing head for reproducing data magnetically from the first read only data recording areas to be used for reproducing said magnetic disc; and
    a recording and reproducing head for magnetically recording data and reproducing data on the second write and read data recording areas to be used for recording and reproducing said magnetic disc.
10. The disc device according to claim 9, comprising:
    a first reproducing amplifier for amplifying a reproducing signal reproduced by said reproducing head and for outputting to a servo circuit and a reproducing circuit;
    a second reproducing amplifier for amplifying a reproducing signal reproduced by said recording and reproducing head and for outputting to said reproducing circuit; and
    selecting means for connecting either of said reproducing signals to be outputted from said first reproducing amplifier and second reproducing amplifier to said reproducing circuit.
11. The disc device according to claim 9, comprising clock generating means for generating a data clock signal which is used to record and reproduce data to or from said second write and read data recording areas depending on the reproduced signal reproduced from clock pits in the servo area arranged on said first read only data recording areas.

12. The disc device according to claim 9, wherein in said servo area, information showing an existence of recorded data is recorded to prevent that data on said first read only data recording areas from being erased, and means for forbidding recording of data in said first read only data recording areas based on said information is further provided.

13. The disc device according to claim 9, wherein in said first read only data recording areas, information of an operating system (OS) in a host computer which is connected thereto is recorded, and said reproducing head reads the data of said OS information.

14. A magnetic disc wherein:

a plurality of tracks are provided, each track is divided into a plurality of angularly arranged segments and each segment is divided into servo areas to record servo information and data recording areas to record data information; and the servo areas and first data recording areas for read only are provided at least on one side on one disc or a plurality of discs stacked upon each other, and second data recording areas to write and read data which are formed by a flat magnetic layer are provided on the other side of the one disc or each of the plurality of discs.

15. The magnetic disc according to claim 14, wherein the first data recording areas and the servo areas are formed in one block as land and groove pit lines.

16. The magnetic disc according to claim 14, wherein the first data recording areas are formed as flat magnetic layer areas and data are written in the areas in advance.

17. The magnetic disc according to claim 14, wherein the side having the servo areas is a side for read only.

18. A magnetic disc wherein:

a plurality of tracks each of which is divided into a plurality of radially extending sectors are provided, the each sector is divided into servo areas to record servo information and data recording areas to record data information; and a read only area comprising the servo areas and the data recording areas formed collectively as land and groove pit lines and a write and read area formed by a flat magnetic layer are mixed together on a same side of the disc.

19. The magnetic disc according to claim 18, wherein the read only area and the write and read area are separated and arranged in the radial direction.

20. The magnetic disc according to claim 19, wherein information to show write protect is recorded on the servo area.

21. The magnetic disc according to claim 19, wherein the read only area and the write and read area are separated and arranged per sector.

22. The magnetic disc according to claim 21, wherein a sector discrimination area is preformed by land and groove pits and information to show write protect is recorded on the area.

23. A disc device comprising:

driving means for turning magnetic discs on which a plurality of tracks, each of which is divided into a plurality of radially extending segments, are provided, the each segment is divided into servo areas to record servo information and data recording areas to record data information, and the servo areas and first read only data recording areas are provided on at least on one side in one disc or a plurality of discs stacked upon each other, and also second write and read data recording areas formed by a flat magnetic layer on the other side of the one disc or each of the plurality of discs are provided;

a reproducing only head for reproducing data magnetically from the first read only data recording areas to be used for reproducing in the magnetic disc; and a recording and reproducing head for magnetically recording data and reproducing data on the second write and read data recording areas to be used for recording and reproducing on the magnetic disc.

24. The disc device according to claim 23, comprising:

a first reproducing amplifier for amplifying a reproducing signal reproduced by the reproducing head and for outputting to a servo circuit and a reproducing circuit;

a second reproducing amplifier for amplifying a reproducing signal reproduced by the recording and reproducing head and for outputting to the reproducing circuit; and selecting means for connecting either of the reproducing signals to be outputted from the first reproducing amplifier and second reproducing amplifier to the reproducing circuit.

25. The disc device according to claim 23, comprising clock generating means for generating a data clock signal which is used to record and reproduce data to or from the second write and read data recording areas depending on the reproduced signal reproduced from clock pits in the servo area arranged on the first read only data recording areas.

26. The disc device according to claim 23, wherein in the servo area, information showing an existence of recorded data is recorded to prevent that data on the first read only data recording areas from being erased, and means for forbidding recording of data in the first read only data recording areas based on the information is further provided.

27. The disc device according to claim 23, wherein in the first read only data recording areas, information of an operating system (OS) in a host computer which is connected thereto is recorded, and the reproducing head reads the data of the OS information.

* * * * *